Jan. 16, 1968  J. W. HARRIGER ET AL  3,363,464
TURBINE METER
Filed April 8, 1965  2 Sheets-Sheet 1

INVENTORS
JOHN W. HARRIGER
EDMUND L. SMOUSE
HARRY W. FISHER
WINSTON F.Z. LEE
BY Strauch, Nolan, Neale,
Nies & Bronaugh
ATTORNEYS Jan. 16, 1968   J. W. HARRIGER ET AL   3,363,464
TURBINE METER
Filed April 8, 1965   2 Sheets-Sheet 2
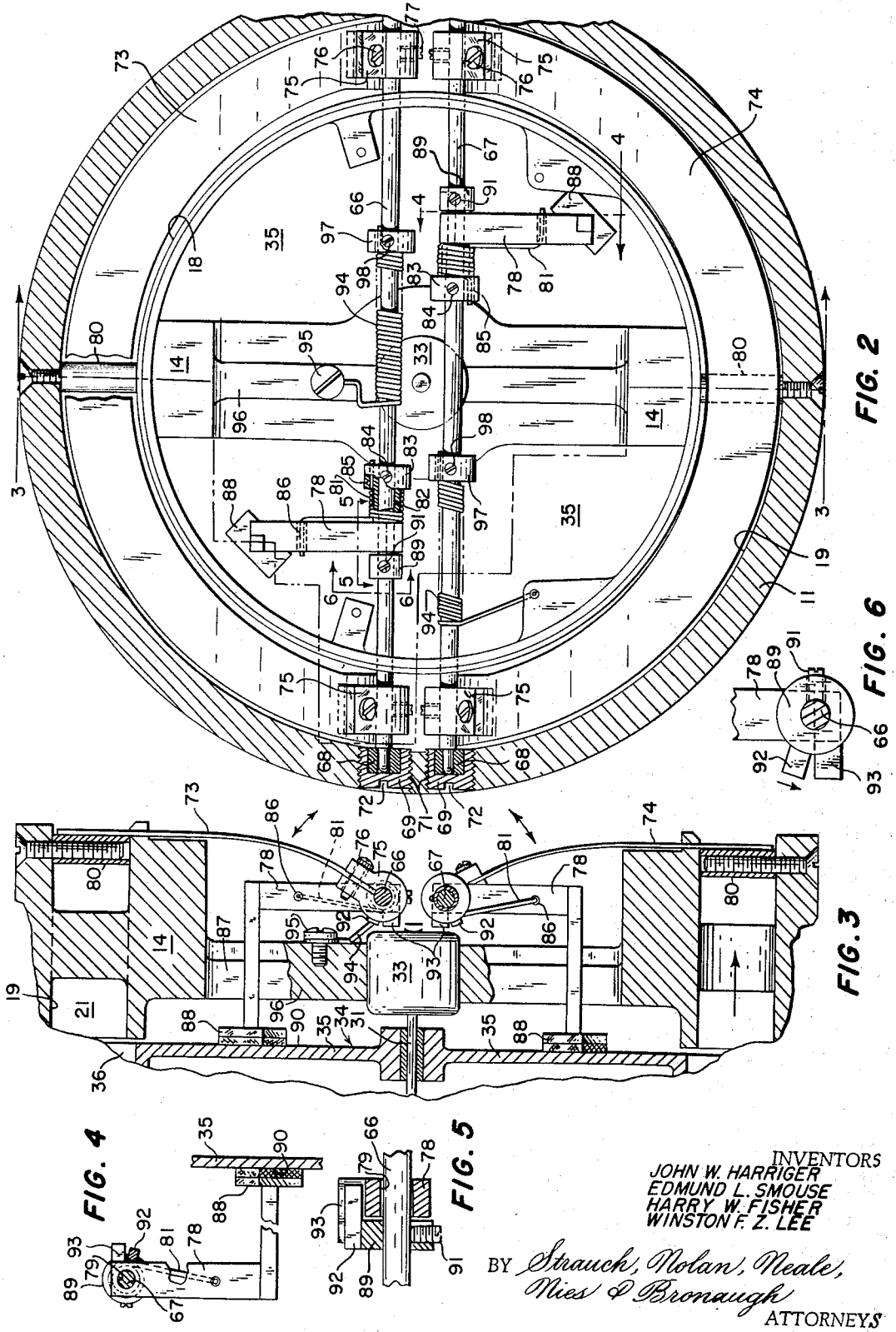
INVENTORS
JOHN W. HARRIGER
EDMUND L. SMOUSE
HARRY W. FISHER
WINSTON F. Z. LEE
BY Strauch, Nolan, Neale,
Nies & Bronaugh
ATTORNEYS

United States Patent Office 3,363,464
Patented Jan. 16, 1968

3,363,464
TURBINE METER
John W. Harriger and Edmund L. Smouse, Du Bois, Harry W. Fisher, Pittsburgh, and Winston F. Z. Lee, Verona, Pa., assignors to Rockwell Manufacturing Company, Pittsburgh, Pa., a corporation of Pennsylvania
Filed Apr. 8, 1965, Ser. No. 446,542
8 Claims. (Cl. 73—230)

ABSTRACT OF THE DISCLOSURE

A turbine meter has a body through which fluid to be measured flows in an annular stream and a bladed rotor is mounted in the flow path to be rotated by fluid flow. Lightweight arcuate vanes are rockably mounted and resiliently biased to extend across the flow path. These vanes are connected to a brake mechanism in such manner that the rotor is braked when there is no fluid flow through the meter and the vanes are disposed in the flow path, and the rotor is freed of such braking when the vanes are moved out of the path of fluid flow by the fluid stream.

---

This invention relates to turbine meters for measuring flow of fluids and particularly to improvements in such meters for increasing the accuracy of registration by positively arresting the rotor against rotation when there is no fluid flow through the meter.

Turbine meters are in use today wherein the fluid to be measured is directed against a rotor which is connected by suitable motion transmitting mechanism to a register or like indicator of volume or other desired flow characteristic. In all of these meters the rotor is mounted so as to have a minimum of frictional or other mechanical resistance to rotation by fluid flow and in some of these meters, even though the rotor is very light in weight, inaccuracies in registration have been noted which have been discovered to be due to over-registration as the rotor coasts to idle position after fluid flow stops.

The present invention overcomes this tendency to over-register by positively arresting rotation of the rotor upon cessation of fluid flow, and it preferably employs fluid flow responsive to braking means for the purpose.

It is the major object of this invention to provide a novel system and structure for automatic arrest of rotation of a turbine meter rotor when fluid flow through the meter stops.

A further object of the invention is to provide a novel braking arrangement for arresting rotation of a turbine meter rotor upon cessation of fluid flow through the meter.

Another object of the invention is to provide a novel combination of fluid flow responsive rotor braking means in a turbine meter wherein a brake is normally applied to hold the rotor against rotation when there is no fluid flow through the meter but wherein the brake is immediately automatically released when fluid flow starts. Pursuant to this object the invention contemplates a novel arrangement of flow responsive vane means and associated rotor brake means.

It is a more specific object of the invention to provide in a turbine meter a novel rotor brake arrangement wherein a movably mounted friction shoe is biased toward engagement with the rotor or a part rotatable with the rotor, and a movable vane disposed in the path of fluid flow through the meter is connected to move the brake shoe and retain it out of engagement with the rotor during fluid flow through the meter.

Further objects of the invention will appear as the description proceeds in connection with the appended claims and the annexed drawings wherein:

FIGURE 2 is an end view partly in section substantially on line 2—2 of FIGURE 1;

FIGURE 3 is a fragmentary view in section substantially on line 3—3 of FIGURE 2;

FIGURE 4, is a fragmentary view mainly in section showing details of the brake lever and mounting; and FIGURES 5 and 6 are enlarged fragmentary views mainly in section showing details of the operative connection between the brake lever and the vane shaft.

Figure 1:
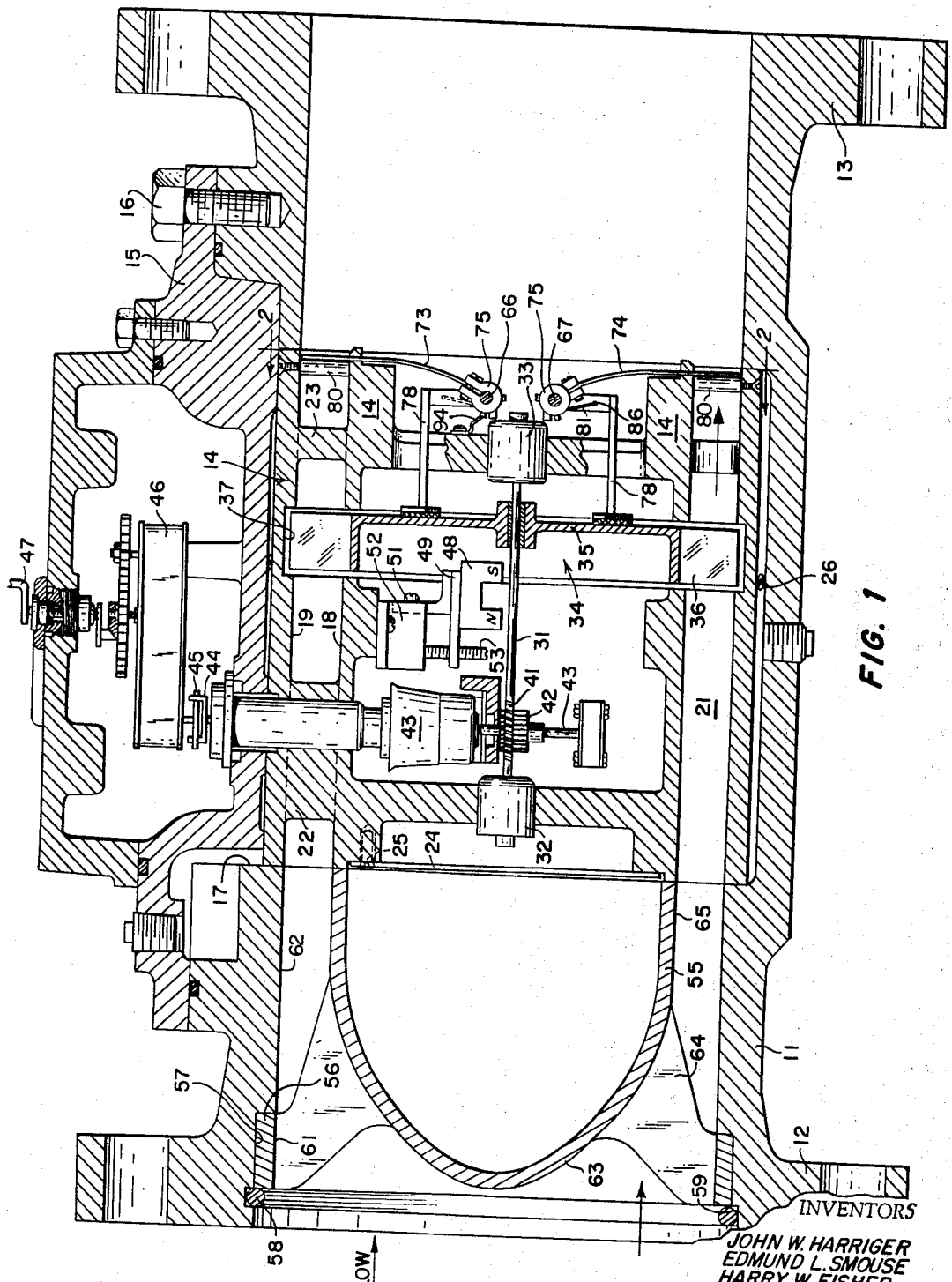
FIGURE 1 is a section through a turbine meter constructed according to a preferred embodiment of the invention.

The turbine meter incorporating the herein described preferred structural embodiment of the invention comprises an annular main housing body 11 having pipe line attachment flanges 12 and 13 at opposite ends.

An internal housing member generally designated at 14 is rigidly mounted within body 11, being secured by means (not shown) to a cover member 15 that is removably attached as by bolts 16 over a body side aperture 17.

Internal housing 14 is formed with inner and outer cylindrical fluid flow boundary surfaces 18 and 19 which define an annular fluid flow channel 21 therethrough that is concentric with the axis of housing 11. Channel 21 is uninterrupted except for a plurality of (usually three) circumferentially spaced integral ribs 22 and 23.

As shown in FIGURE 1, an upstream end plate 24 is secured upon internal housing 14, as by screws 25. A similar end plate (not shown for the sake of clarity of disclosure of the invention) is mounted over the downstream end of housing 14. These end plates shield the enclosed mechanisms against line fluid. A seal gasket 26 is preferably interposed between the outside of internal housing 14 and the inner surfaces of housing body 11 and cover 15.

A central shaft 31 coaxial with housing 11 and flow channel 21 is supported at opposite ends in fixed axis bearing units 32 and 33. A rotor 34 is secured upon shaft 31 and comprises a web 35 having a series of peripheral blades 36 that are inclined relative to axial fluid flow in channel 21. The outer channel surface 19 is formed with a shallow groove 37 in surrounding relation to the rotor. The outer peripheries of the blades 36 preferably extend slightly into the groove 37, and the groove 37 is suitably wider than the axial length of blades 36.

Shaft 31 carries a worm 41 meshed with a gear 42 on a vertical transfer shaft 43 which is connected through a magnetic coupling 43 to an output shaft having a driving dog 44 connected to a driven dog 45 which in turn is connected through a gear train 46 and associated mechanism to a register driving element 47. These drive arrangements between shaft 31 and the register are preferably more or less conventional as far as the invention is concerned, and one preferred form of drive is disclosed in the pending application of Winston F. Z. Lee et al. Ser. No. 319,027 filed Oct. 25, 1963, now United States Letters Patent No. 3,304,780 issued Feb. 21, 1967.

A magnet 48 longitudinally aligned with shaft 31 is mounted on a bracket 49 which is vertically adjustably secured, as by screw 51, to a support 52 fixed to housing 14. By this arrangement magnet 48 may be adjusted toward or away from shaft 31. A fine adjustment screw 53 threaded in bracket 49 bears on support 52 for fine adjustment of magnet 48 relative to shaft 31. By this arrangement the magnetic pull of magnet 48 may be made to accurately counterbalance the weight of the rotating steel shaft 31 and the rotor in the assembly to appreciably reduce the frictional resistance to turning of rotor 34.

Upstream of internal housing 14 an inlet diffuser member 55 is rigidly supported within housing body 11 by a peripheral ring 56 fitted into an internal body recess 57 and fixedly held there by a retainer snap ring 58 mounted in body groove 59. The inner periphery 61 of ring 58 is a substantial continuation of the cylindrical inner periphery 62 of housing body 11 which is aligned with outer channel surface 19. The diffuser 55 which as a rounded stream lined end 63 facing the fluid flow stream is connected to ring 56 by several relatively thin support webs 64 that do not materially affect fluid flow. The outer cylindrical periphery 65 of diffuser 55 is aligned with inner channel surface 18.

Thus fluid entering at the left side of body 11 in FIGURE 1 is channeled between surfaces 62 and 65, flows as an annular stream through channel 21 to impinge upon rotor blades 36 and thereby rotate rotor 34 about its axis in response to fluid flow through the meter.

At the downstream side of internal housing 14, the housing body 11 is transversely bridged by upper and lower parallel vane mounting shafts 66 and 67. These shafts 66 and 67 are disposed at equal distances about and below the horizontal plane of drive shaft 31, and they extend at right angles to the axis of rotation of rotor 34.

At opposite ends each vane mount rock shaft is freely rotatably mounted in a bearing 68 contained in outwardly removable plugs 69 threaded at 71 into the body side wall. The plugs have external screw drive slots 72 for ready removal and for proper axial positioning of shafts 66 and 67 within the meter body.

Upper and lower identical flow responsive vanes 73 and 74 are preferably integral lightweight stamping elements of sheet aluminum about .025″ thick. As shown in FIGURE 2, upper vane 73 is substantially semi-circular in extent, having a radial width approximately equal to that of channel 21. The opposite ends of vane 73 are rigidly secured to clamps 75 as by screws 76, and clamps 75 are in turn rigidly secured to shaft 66 as by set screws 77. Vane 74 is similarly secured to shaft 67.

At one side of center on shaft 66, see FIGURES 2, 4 and 5, a brake lever 78 is formed with a bore 79 by which it is freely rotatably pivoted on shaft 66. A coiled spring 81 mounted on the boss 82 of a collar 83 fixed to shaft 66 as by set screw 84 has one end anchored on collar 83 at 85 and its other end extends upwardly to enter an aperture 86 in lever 78.

Spring 81 biases lever 78 to rotate clockwise about shaft 66 in FIGURE 3. The upper end of lever 78 extends through the apertured space 87 of housing 14, and a friction brake shoe block 88 is mounted on the lever, so that spring 81 normally biases brake block 88 away from frictional engagement with web 35 of the rotor. Web 35 of the rotor has a circumferentially continuous braking surface 90 that lies mainly in a plane perpendicular to the axis of the rotor.

A brake control dog 89 is secured upon shaft 66 as by set screw 91 and (FIGURE 5) a rigid lug 92 projecting axially therefrom engages a lug 93 rigid with the lower end of brake lever 78.

A coil spring 94 surrounding shaft 66 has one end anchored on a post 95 rigid with a rib 96 on the inner wall of body 11, and its other end is anchored in a collar 97 fixed on shaft 66 as by set screw 98. This spring 94 constantly biases shaft 66 counterclockwise in FIGURE 3 whereby, because of the engagement of lugs 92 and 93 (see FIGURES 5 and 6) the brake lever is rocked to dispose vane 73 across the upper half of channel 21 and at the same time apply brake shoe block 88 against the rotor when there is no fluid flow in channel 21.

This energizes spring 81 and produces the relationship of parts shown in FIGURES 1 and 3 which prevails when there is no fluid flow through channel 21. A suitable stop 80 comprising a polished cylindrical sleeve freely journalled on a fixed post engages the middle portion of vane 73 to limit movement of the vane into the channel toward the rotor 34.

Similarly below the level of vane 73, the vane 74 is mounted on shaft 67 and identical brake and spring elements are mounted thereon, the same reference numerals being applied in FIGURES 1, 2 and 3 to the corresponding parts. Thus, when there is no fluid flow in channel 21, shaft 67 which is biased clockwise in FIGURES 1 and 3 by its housing anchored spring 94 acts through the dog 89 and lugs 92, 93 to rock brake lever 78 clockwise about shaft 67 to apply brake shoe block 88 to rotor web 35 and to dispose vane 74 across the lower half of channel 21 in abutment with lower stop 80. This action winds springs 81 to increased energization.

The brake shoes 88 are simultaneously applied to the rotor at diametrically opposed points for balanced action as shown in FIGURE 2. When there is fluid flow in channel 21, from left to right in FIGURES 1 and 3, such simultaneously speedily displaces the lightweight vanes 73 and 74 out of the path of channel 21 and maintains them effectively out of the fluid flow path, the vanes rocking oppositely and acting to remove lugs 92 away from lugs 93, which enables springs 81 to assert themselves and quickly rock the brake levers 78 to simultaneously remove brake blocks 88 from frictional engagement with the rotor. Springs 94 are further energized during this action. The rotor 34 is now free to rotate in response to fluid flow and its rotation is transmitted to drive the register in the normal manner.

When fluid flow in channel 21 ceases, springs 94 rock shafts 66 and 67 to simultaneously rock brake levers 78 to apply brake blocks 88 to the rotor web 35 and insure speedy arrest of rotation of the rotor.

Since the vanes 73 and 74 are of extremely light weight and low inertia, and they have a large area exposed to fluid flow, their response to relax the brake on the rotor is substantially immediate with fluid flow. Similarly the spring 94 is sufficiently powerful to insure speedy return to rotor braking condition when the fluid flow ceases, so that inaccuracies of registration are minimized.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a turbine meter having a body through which fluid is adapted to flow, a rotor adapted for operation of associated indicating means and mounted for rotation within said meter, blades on the rotor disposed in the path of fluid flow, a rock shaft mounted within said meter, flow responsive vane means mounted on said rock shaft, resilient means biasing said vane means to extend into said path of fluid flow, a brake lever pivoted on said rock shaft operably connected to brake means for said rotor, and means operatively connecting said brake lever with said rock shaft so as to apply said brake means to the rotor to arrest rotation of said rotor when said vane means is disposed in said path and there is no fluid flow through the meter and to free said rotor for rotation when said vane means is moved out of said path in response to fluid flow through said meter.

2. In the turbine meter defined in claim 1, said fluid moving in an annular stream through said body, and said vane means being substantially annular in conformity with said stream.

3. In a turbine meter having a body mounting indicating means, means defining a fluid flow path through said meter body, a rotor operably connected to actuate said indicating means mounted for rotation within said meter and having blades disposed in said path, a rock shaft mounted within said meter, flow responsive vane means mounted on said rock shaft, resilient means biasing said vane means to extend into said path, a brake lever pivoted on said rock shaft operably connected to brake means for said rotor, means operatively connecting said brake lever with said rock shaft so as to apply said brake means to the rotor to arrest rotation of said rotor when said vane means is disposed in said path and there is no fluid flow through the meter, and means operatively connecting said brake lever to move with said rock shaft to release said brake means to free said rotor for rotation when said vane means is moved out of said path in response to fluid flow through said meter.

4. In a turbine meter having a body mounting indicating means, means defining an annular fluid flow path through said meter body, a rotor operably connected to actuate said indicating means and mounted for rotation coaxially of said path and having blades disposed in said path, a rock shaft within the meter, arcuate vane means mounted on said rock shaft normally biased to extend into said path and adapted to be moved effectively out of said path by fluid flow through the meter, said vane means comprising a thin lightweight element extending over said annular flow path and secured at opposite ends to said rock shaft, and braking means for said rotor operably connected to said rock shaft in such manner as to arrest rotation of said rotor when there is no fluid flow through the meter and to free said rotor for rotation in responsive to fluid flow through said meter.

5. In the turbine meter defined in claim 4, a stop in said path defining means arresting movement of said element into said path.

6. In a turbine meter having a body containing means defining an annular fluid flow path through the meter body, a rotor adapted for actuation of an associated indicating means rotatably mounted coaxially of said path and having blades extending into said path, a rock shaft transversely extending across said body downstream of said rotor, an arcuate vane element secured at opposite ends to said shaft, resilient means biasing said shaft in one direction to project said vane element into the flow path when there is no fluid flow along said path, said vane element being adapted to swing effectively out of said path and be maintained out of said path by fluid flow past said rotor blades, a brake lever pivoted on said shaft and carrying a brake shoe, means providing a positive coupling between said shaft and lever for rocking said shaft with said lever in said one direction to apply said brake shoe to the rotor when there is no fluid flow through the meter, and means automatically retracting said brake shoe from engagement with the rotor when said vane element rocks the shaft in response to fluid flow through said meter.

7. In the turbine meter defined in claim 6, there being two of said rock shafts arranged in parallel adjacent the axis of said rotor, with a vane element mounted on each rock shaft and a brake lever operated by each vane element, with said brake levers applying said brake shoes to substantially diametrically opposite points on said rotor.

8. In the turbine meter defined in claim 6, said vane element being a lightweight sheet component of uniform width radially of said flow path.

References Cited
UNITED STATES PATENTS

| | | | |
|---|---|---|---|
| 867,854 | 10/1907 | Thorp | 73—230 |
| 1,424,220 | 8/1922 | Thorp et al. | 73—230 |
| 2,098,280 | 11/1937 | Dornseif | 73—230 |

FOREIGN PATENTS 2,029  12/1903  Great Britain.

RICHARD C. QUEISSER, *Primary Examiner.*

JAMES J. GILL, *Examiner.*

E. D. GILHOOLY, *Assistant Examiner.*